April 25, 1933.  H. FUCHS  1,905,845
HAND BRAKE
Filed Aug. 1, 1930  2 Sheets-Sheet 1

Witness
Wm. Geiger

Inventor
Henry Fuchs
By Joseph Harris
His Atty.

April 25, 1933.  H. FUCHS  1,905,845
HAND BRAKE
Filed Aug. 1, 1930   2 Sheets-Sheet 2
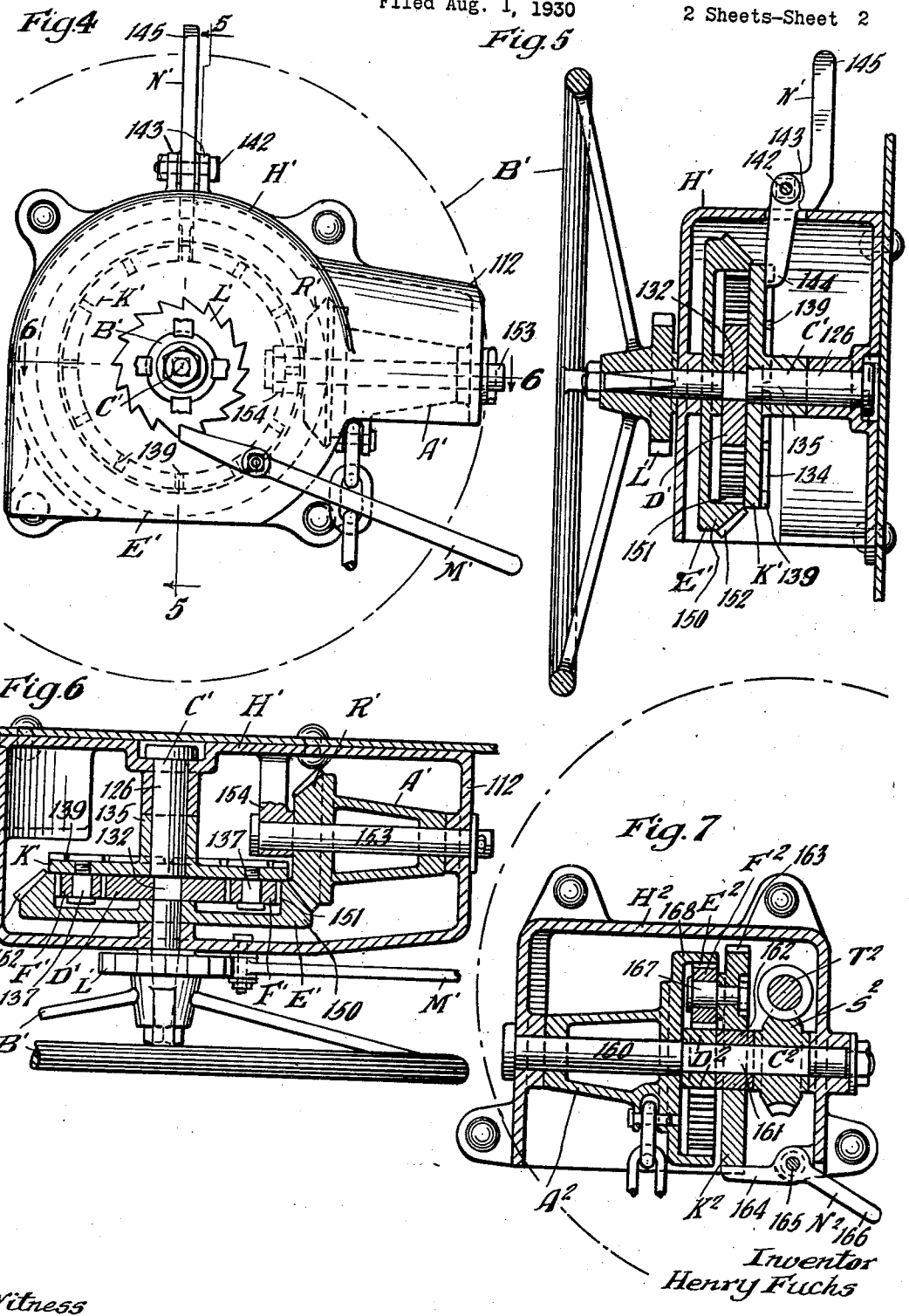
Witness
Wm. Geiger
Inventor
Henry Fuchs
By Joseph Harris
His Atty Patented Apr. 25, 1933

1,905,845

UNITED STATES PATENT OFFICE

HENRY FUCHS, OF CHICAGO, ILLINOIS, ASSIGNOR TO W. H. MINER, INC., OF CHICAGO, ILLINOIS, A CORPORATION OF DELAWARE

HAND BRAKE

Application filed August 1, 1930. Serial No. 472,227.

This invention relates to improvements in hand brakes.

One object of the invention is to provide a simple and efficient power multiplying hand brake mechanism especially adapted for railway cars including a chain winding drum, an operating hand wheel and power multiplying gearing for driving the drum, wherein free running of the chain winding drum without rotation of the hand wheel is had during release, by means of planetary movement between certain of the power multiplying gears.

Another object of the invention is to provide a hand brake mechanism, as specified in the preceding paragraph, wherein the gear having planetary movement during release is mounted on a planetary carrier which is locked against rotation during the chain tightening operation to hold the planetary gear against orbital movement and the carrier is unlocked to permit planetary movement thereof and said gear to release the brakes, thereby permitting free running of the chain winding drum without rotation of the hand wheel, means being also provided for positively holding the hand wheel against rotation in an unwinding direction during release, thereby protecting the brakeman against injury.

Other objects of the invention will more clearly appear from the description and claims hereinafter following.

Figure 1:
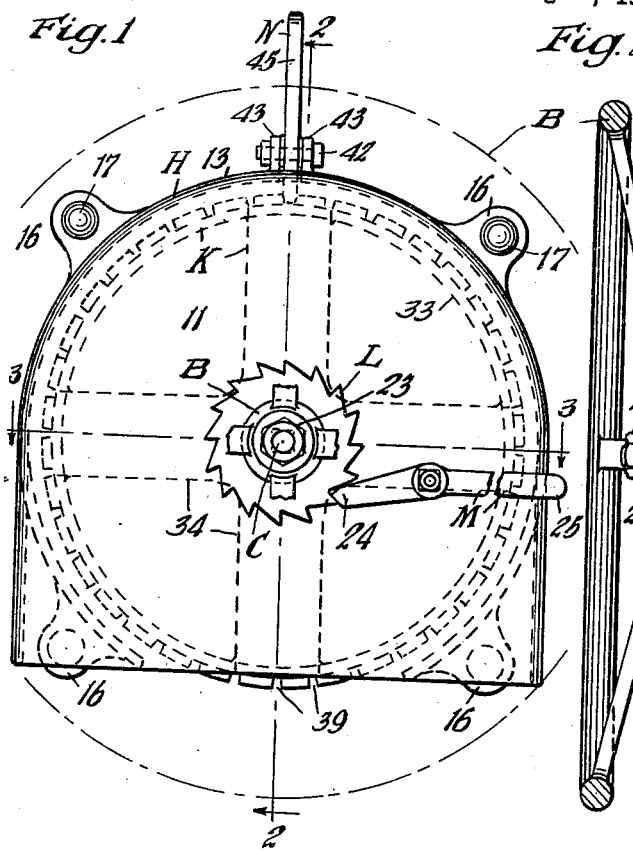
Figure 2:
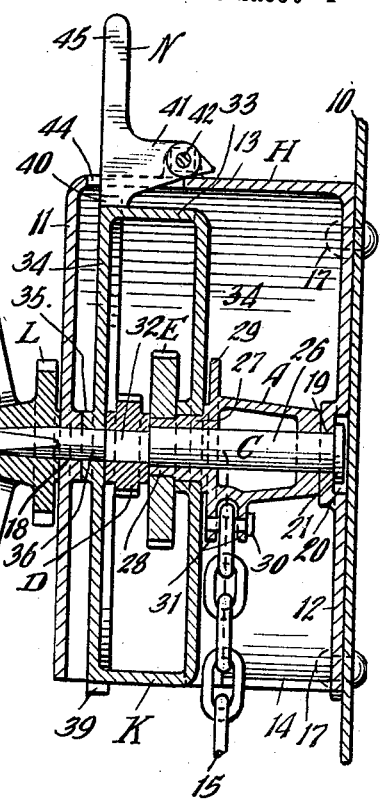
Figure 3:
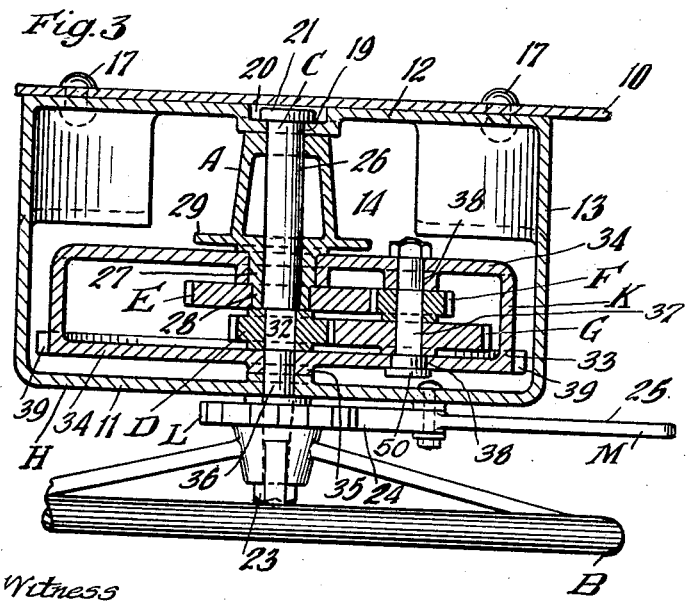

In the drawings, forming a part of this specification, Figure 1 is a front elevational view of a hand brake mechanism, illustrating my improvements in connection therewith, the hand brake mechanism being shown as applied to the end wall of a railway car. Figure 2 is a vertical, transverse sectional view corresponding substantially to the line 2—2 of Figure 1. Figure 3 is a horizontal, transverse, sectional view corresponding substantially to the line 3—3 of Figure 1. Figure 4 is a view similar to Figure 1, illustrating a different embodiment of the invention. Figure 5 is a vertical, sectional view corresponding substantially to the line 5—5 of Figure 4. Figure 6 is a horizontal, sectional view corresponding substantially to the line 6—6 of Figure 4. And Figure 7 is a vertical, sectional view in a plane parallel to the end wall of a car, illustrating a still further embodiment of the invention.

Referring first to the embodiment of the invention illustrated in Figures 1, 2 and 3, my improved hand brake mechanism comprises broadly a chain winding drum A; an operating hand wheel B; an operating shaft C; a driving gear D; a driven gear E; a pair of planetary gear members F and G; a housing H; a planetary gear carrier K; a ratchet wheel L; a locking pawl M; and a locking dog N.

My improved hand brake mechanism is contained within the housing H, which is mounted on the vertical end wall 10 of a railway car. The housing comprises spaced vertical front and rear walls 11 and 12 and a substantially circular connecting side wall 13, which is open at the bottom, as indicated at 14, to accommodate the chain 15. The chain 15 is connected in the usual manner to the brake mechanism proper, not illustrated. The rear wall of the housing is provided with a plurality of securing lugs 16—16, which as herein shown are four in number and are secured to the end wall 10 of the car by rivets 17—17 extending therethrough, and through said end wall. The operating shaft C is journaled in bearing members 18 and 19 provided in the front and rear walls respectively of the housing, the bearing member 19 of the rear wall being inwardly offset, thereby providing a pocket or recess 20 adapted to accommodate a retaining head 21 at the inner end of the operating shaft C. At the outer end, outwardly of the front wall 11 of the housing H, the operating shaft carries the hand wheel B, which is fixed thereto, the extremity of the operating shaft being provided with a tapered portion 22 of angular cross section fitting within an opening of similar cross section provided in the hub of the hand wheel B. The hand wheel is held to the operating shaft by means of a securing nut 23 threaded on the shaft. The hub of the hand wheel B has the ratchet member L formed integral therewith, the member L being disposed outwardly of the front wall 11 of the housing. The locking pawl M is pivoted on the front wall 11 of the housing, as clearly shown in Figure 1, and has a tooth 24 at the inner end thereof which cooperates with the teeth of the ratchet member L to hold the hand wheel B against rotation in chain unwinding direction. At the opposite end, the locking pawl M is provided with an operating hand grip 25 by which the same may be manipulated so as to disengage the tooth from the ratchet member L. The handle member 25 is weighted so that the tooth 24 is normally held in engagement with the teeth of the ratchet member L by the action of gravity.

The chain winding drum A is journaled on the inner end portion of the shaft C, which inner end portion is of substantially cylindrical form, as indicated at 26. At the inner end, the chain winding drum bears directly on the offset portion 19 of the rear wall of the housing. At the forward end the drum is provided with a hub section having an inner portion 27 of cylindrical cross section and an outer portion 28 of angular or square cross section. As most clearly shown in Figures 2 and 3, the chain winding drum is of conical form and has an annular flange 29 at the larger end thereof. The chain 15 is secured to the chain winding drum by means of a retaining bolt or rivet 30 extending through the end link of the chain and a pair of projecting lugs 31—31 on the drum, between which the end link of the chain is disposed.

Outwardly of the cylindrical portion 26, the shaft C is provided with a short section 32 of substantially square cross section on which the gear D is mounted. The gear D is provided with an opening of similar cross section to the portion 32 of the shaft, whereby the gear is rotatable with the shaft and is driven by the hand wheel B, when rotated. The gear E, which is of larger diameter than the gear D, is mounted on the square portion 28 of the hub of the chain winding drum A and is rotatable therewith.

The carrier K has a substantially circular outer wall 33 connected by front and rear cross members 34—34, the cross members having hub portions 35—35 provided with substantially cylindrical bearing openings, the opening of the front cross members being of smaller diameter than the opening of the rear members and receiving the outer cylindrical portion 36 of the shaft C. The bearing opening of the inner cross members receives the cylindrical portion 27 of the hub of the chain winding drum. As will be evident, the carrier K is thus mounted for free rotation on the shaft C and the hub of the chain winding drum. The carrier K has the gears F and G mounted thereon, the gears F and G being disposed between two opposed arms of the front and rear cross members and being secured to a short shaft 37 having a section of substantially square cross section extending through the hub members of the gears F and G, whereby the gears are fixed to the shaft for rotation in unison therewith. The opposite ends of the shaft 37 are of cylindrical cross section and are rotatably mounted in alined bearing openings 38—38 provided in said opposed arms of the cross members. As most clearly shown in Figure 3, the inner end of the shaft 37 is provided with a head 50 abutting the corresponding cross member and the opposite end of the shaft is provided with a securing nut by which the same is retained in position. The gear F meshes with the gear E and is of smaller diameter than the same, while the gear G meshes with the gear D and is of larger diameter than the latter.

The periphery of the carrier K is provided with a plurality of locking notches 39—39 with which the locking dog N cooperates, the latter being provided with a depending tooth 40, which is adapted to engage said notches. As most clearly shown in Figures 1 and 2, the locking dog N is provided with a lateral extension 41, which is pivoted on a bolt 42 extending through lugs 43—43 on the top wall of the housing. The housing wall 13 is provided with a slot or opening 44 through which the locking dog N projects. The locking dog has an upstanding handle portion 45 by which the same may be manipulated. In the normal condition of the parts, the locking dog N is held engaged with the notches 39—39 of the carrier K by the action of gravity.

In winding the chain to tighten the brakes, the parts are in the position illustrated in Figures 1, 2 and 3, the locking dog N being engaged with the notches of the carrier K and the pawl M being engaged with the teeth of the ratchet member L. To tighten the brakes, the hand wheel D is rotated in a clockwise direction, as viewed in Figure 1, thereby rotating the gear D in the same direction. The gear D meshing with the gear G causes rotation of the latter and the gear F. The gear F in turn effects rotation of the gear E, which is secured to the chain winding drum A, thereby rotating the drum in a direction to wind the chain 15 thereon. As will be evident, during this operation the carrier K is held against rotation and reverse rotation of the hand wheel is prevented by the locking pawl M cooperating with the ratchet L. When it is desired to release the brakes, the locking dog N is disengaged from the carrier K, thereby permitting free rotation thereof about the axis of the operating shaft and planetary movement of the gears D and E. Due to the release of the carrier K, the chain winding drum A is free to rotate, thereby permitting unwinding of the chain. During this action, the gear E, which is secured to the chain winding drum, will effect rotation of the gears F and G on their axis and planetary movement of the same around the gear D which remains stationary, the locking pawl M preventing rotation thereof in an unwinding direction. To again wind the chain, it is merely necessary to lock the carrier K by means of the dog N. As will be evident, the arrangement of gearing provided by the gear members D, E, F and G provides for power multiplication during the chain winding operation.

In case it is desired to back up the brakes, the carrier K is held locked by the dog N and the operator disengages the pawl M from the ratchet, thus permitting rotation of the hand wheel B in an unwinding direction.

Referring next to the embodiment of the invention illustrated in Figures 4, 5 and 6, my improved brake mechanism comprises a chain winding drum A′, a hand wheel B′, an operating shaft C′, a driving gear D′, a driven gear member E′, planetary gear members F′—F′, a carrier K′, a ratchet L′, a locking dog N′, a driving connection between the gear E′ and chain winding drum A′ comprising beveled gearing R′ and a locking pawl M′, cooperating with the ratchet L′.

My improved hand brake mechanism, as illustrated in Figures 4, 5 and 6, is mounted within a housing H′, which is similar to the housing H hereinbefore described, with the exception that it is provided with a lateral extension 112 within which the chain winding drum is mounted.

The operating shaft C′ is journaled in the bearing members provided in the front and rear walls of the housing and has the hand wheel B′ secured to the outer end thereof in the same manner that the hand wheel B is secured to the shaft C. The ratchet member L′ is also formed integral with the hub member of the hand wheel B′. At the inner end the shaft C′ has a cylindrical portion 126 on which the carrier K′ is mounted for free rotation. As most clearly shown in Figures 5 and 6, the carrier K′ is in the form of a disc having a hub section 135 thereof mounted on the cylindrical portion 126 of the shaft C′. The carrier K′ is provided with an annular laterally projecting flange 134 on the inner side thereof, which is notched at intervals as indicated at 139—139. The locking dog N′, which is pivoted on a bolt 142 extending through upstanding lugs 143—143 on the top wall of the housing, has a locking arm 144, which cooperates with the notches of the carrier K′ to lock the latter against rotation. The locking dog N′ has an upstanding handle 145 by which the same may be manipulated.

The planetary gear members F′—F′ are mounted on stub shafts 137—137 secured to the disc section of the carrier K′, at diametrically opposite sides thereof. The gear D′ is fixed to the operating shaft C′ so as to rotate therewith, the shaft being provided with a square section 132 extending through a similar opening at the center of the gear. The gear member E′ is mounted for free rotation on the outer cylindrical end portion of the operating shaft C′. As most clearly shown in Figures 5 and 6, the gear member E′ has a relatively heavy laterally projecting annular flange portion 150 provided with internal gear teeth 151 which mesh with the gears F′—F′. The flange 150 of the gear E′ is also provided with an annular series of external beveled gear teeth 152. The chain winding drum A′ is mounted for free rotation on a relatively short shaft 153, having its opposite ends journaled in a bearing opening in the end wall of the section 112 of the housing and in a bracket 154 respectively, the bracket projecting from the inner wall of the housing. The drum A′ is of similar design to the drum A and has the brake chain operatively connected thereto. At the inner end, the drum A′ is provided with the beveled gear member R′, which is formed integral therewith and meshes with the beveled gear teeth of the gear E′.

In winding the chain, the operation of my improved hand brake mechanism, as illustrated in Figures 4, 5 and 6, is as follows: The locking dog N′ is interlocked with the carrier K′ so as to hold the latter against rotation. The hand wheel B′ is rotated in a clockwise direction, as viewed in Figure 4, thereby rotating the shaft C′ and the gear D′ therewith. Inasmuch as the gear D′ meshes with the gears F′—F′, and the disc K′ is held stationary, the gears F′—F′ will transmit the power to the gear E′, thereby rotating the latter about the axis of the shaft C′. The brake drum A′ in turn will be rotated in a chain winding direction by the bevel gear means comprising the gear R′ and the bevel gear teeth on the periphery of the gear E′. During this action, the hand wheel and operating shaft C′ will be held against reverse rotation by the locking pawl, which cooperates with the ratchet L′, thereby also holding the chain winding drum A′ against rotation in an unwinding direction.

To release the brakes and permit free running of the chain winding drum A′, the locking dog N′ is disengaged from the carrier K′, thereby permitting free rotation of the latter. Inasmuch as the gear E′ is operatively connected to the chain winding drum A′ by the bevel gear R′, the gear E′ will be rotated during the unwinding of the chain, thereby effecting rotation of the gears F′—F′. As the hand wheel D′ and the operating shaft C′ are held against rotation in an unwinding direction by the locking means which cooperates with the ratchet L′, the gears F′—F′ will be forced to travel about the gear D' during the unwinding of the chain. In case it is desired to back up the brakes, the mechanism is operated in the same manner, as hereinbefore described, in connection with the embodiment of the invention illustrated in Figures 1, 2 and 3, the pawl being disengaged from the ratchet L' and the dog N' being interlocked with the carrier K'.

Referring next to the embodiment of the invention illustrated in Figure 7, the same comprises broadly a chain winding drum $A^2$ having an internal gear member $E^2$ formed integral therewith, a carrier $K^2$ having a planetary gear member $F^2$ mounted thereon, an operating shaft $C^2$ carrying a gear member $D^2$, a worm wheel $S^2$, a worm member $T^2$, a locking dog $N^2$ and an operating hand wheel, connected to the worm $T^2$. The operative parts of the improved hand brake mechanism illustrated in Figure 7 are mounted within a housing $H^2$, which is secured to the end wall of the car. The operating shaft $C^2$ is rotatably journaled in opposed side walls of the housing, as clearly shown. The shaft has a section 160 of cylindrical cross section on which the chain winding drum $A^2$ is freely rotatable. The shaft $C^2$ is also provided with a section of substantially square form 161 on which the worm wheel $S^2$ and the gear $D^2$ are mounted, the worm and gear being provided with square openings receiving the portion 161 of the shaft so that these two members rotate with the shaft. Between the worm wheel $S^2$ and the gear $D^2$, the shaft $C^2$ carries a collar 162 on which the carrier $K^2$ is freely rotatable. The carrier $K^2$ is in the form of a disc having peripheral notches 163 with which the locking finger 164 of the dog $N^2$ cooperates. The dog $N^2$ is pivotally supported on a pin 165 extending through inwardly projecting lugs on the corresponding side wall of the housing. As shown, the locking dog $N^2$ is provided with an operating handle 166 which overbalances the finger 163 so as to hold the same engaged with the notches of the carrier $K^2$. The carrier $K^2$ supports the gear $F^2$ for rotation about the gear $D^2$, the gear $F^2$ being rotatably supported on a stub shaft 167 secured to the carrier. The gear $E^2$ is formed by a laterally projecting annular flange 168 formed on the chain winding drum $A^2$ and is provided with internal teeth which mesh with the teeth of the gear $F^2$. The gear $F^2$ meshes with the gear $D^2$ and is driven thereby in the chain tightening operation. The worm $T^2$, which cooperates with the worm wheel $S^2$ may be formed integral with the shaft, which carries the hand wheel and is journaled in the front and rear walls of the housing $H^2$ in any suitable manner. The operation of my improved hand brake mechanism, as illustrated in Figure 7, during a chain tightening operation is as follows: The worm member $T^2$ is rotated by the hand wheel, thereby effecting rotation of the worm wheel $S^2$ and the shaft $C^2$. As the gear $D^2$ is fixed to the shaft, the latter is rotated and effects rotation of the gear $F^2$, which is held against planetary movement by the disc or carrier $K^2$, which is locked by the dog $N^2$. Rotation of the gear $F^2$ imparts rotation to the internal gear $E^2$ on the chain winding drum, with resultant rotation of the latter and winding of the chain thereon. To effect release of the brakes, the dog $N^2$ is unlocked from the disc $K^2$, permitting free rotation of the latter about the shaft $C^2$. Unwinding of the chain from the drum $A^2$ effects rotation of the latter and thereby rotation of the planetary gear $F^2$ about the gear $D^2$, the gear $F^2$ being secured to the carrier $K^2$ effecting rotation of the latter about the shaft $C^2$. As will be evident, due to the worm drive provided by the worm $T^2$ and the worm wheel $S^2$, the hand wheel will remain idle during the unwinding of the brake chain inasmuch as the friction between the members of the worm means is sufficiently great to prevent rotation of the worm wheel $S^2$ and the shaft $C^2$.

I have herein shown and described what I now consider the preferred manner of carrying out my invention, but the same is merely illustrative and I contemplate all changes and modifications that come within the scope of the claims appended hereto.

I claim:

1. In a hand brake mechanism, the combination with a chain winding drum; of a hand wheel; power-multiplying gear means operatively connecting the hand wheel and chain winding drum, said gear means including a pair of gear members rigidly connected to each other and mounted for planetary movement; means for normally locking said members against planetary movement but permitting axial rotation thereof, whereby the power is transmitted through said gear means to the drum to wind the chain and tighten the brakes, said locking means being releasable to permit planetary movement of said members, thereby allowing free running of the chain winding drum with respect to the hand wheel to release the brakes; and a locking dog for positively holding said hand wheel against rotation in an unwinding direction.

2. In a hand brake, the combination with an operating shaft having a hand wheel fixed thereto; of a gear fixed to said shaft; a chain winding drum having a gear fixed thereto; a pair of gears fixed to each other and rotatable in unison, said last named gears meshing with said first named gears and mounted for planetary movement about said first named gears; a carrier on which said pair of gears are rotatable, said carrier being rotatable about the axis of said first named gears; a locking dog cooperating with said carrier and manually actuated means for operating said dog to withdraw the same from locking position.

3. In a hand brake, the combination with an operating shaft having a hand wheel fixed thereto; of a gear fixed to said shaft; a chain winding drum having a gear fixed thereto and rotatable in unison therewith; a pair of gears fixed to each other meshing with said first named gears, said pair of gears being mounted for planetary movement about said first named gears; a rotary carrier on which said pair of gears are mounted for rotation about a common axis eccentric to the axis of rotation of the carrier, said carrier being rotatable about the axis of said first named gears; a releasable locking dog cooperating with said carrier to hold the same against movement while the brake is being tightened; manually operated lever means for actuating said dog to release the same; and ratchet means for holding said hand wheel against rotation in unwinding direction while said dog is released.

In witness that I claim the foregoing I have hereunto subscribed my name this 29th day of July, 1930.

HENRY FUCHS.